United States Patent [19]

Bugg

[11] Patent Number: 4,908,706
[45] Date of Patent: Mar. 13, 1990

[54] TELETEXT DECODER ARRANGEMENTS

[75] Inventor: Richard E. F. Bugg, Coulsdon, England

[73] Assignee: U.S. Philips Corporation, New York, N.Y.

[21] Appl. No.: 310,801

[22] Filed: Feb. 14, 1989

[30] Foreign Application Priority Data

Feb. 26, 1988 [GB] United Kingdom ................ 8804608

[51] Int. Cl.$^4$ ............................................. H04N 7/08
[52] U.S. Cl. .................................... 358/147; 358/142
[58] Field of Search ........................ 358/142, 146, 147

[56] References Cited

U.S. PATENT DOCUMENTS 4,679,083  7/1987  Schmitz et al. ..................... 358/147

OTHER PUBLICATIONS

BBC et al, "Broadcast Teletext Specification", Sep. 1976, pp. 1–20.
Specification for Mullard's SAA 5231, Nov. 1986, "Teletext Video Processor".
Specification for Mullard's SAA 5243, Apr. 1987, "Enhanced Computer Controlled Teletext Circuit".
Specification for Mullard's MAB 8031H and MAB 8051AH, Nov. 1986, "Single-Chip 8-Bit Microcomputer".
Specification for Signetics 74LS670, Dec. 1985, "Register File".
User's Manual, entitled "Computer Controlled Teletext", by J. R. Kinghorn; published by Mullard Application Laboratory; 1983.

*Primary Examiner*—John W. Shepperd
*Assistant Examiner*—Michael D. Parker
*Attorney, Agent, or Firm*—Thomas A. Briody; Jack E. Haken; Anne E. Barschall

[57] ABSTRACT

A teletext decoder arrangement has a page memory comprising a large number of chapters or portions in which individual pages can be stored. The arrangement has a plurality of data acquisition circuits which can acquire separate pages simultaneously. A register file is provided having a word location for each data acquisition circuit. A processor can load a memory chapter pointer byte into a word location when a page is to be acquired by the related data acquisition circuit so as to allot the memory chapter identified by the pointer byte for the storage of that page. In a practical embodiment four 4-bit word locations can have any one of 16 different 4-bit pointer bytes loaded into them to identify any one of 16 different memory chapters.

13 Claims, 2 Drawing Sheets

TELETEXT DECODER ARRANGEMENTS

DESCRIPTION

This invention relates to teletext decoder arrangements for receiving, storing and processing teletext information which is transmitted as digitally coded data and comprises a plurality of different pages each of which is identified by a respective page number. Transmissions of teletext information are in television signals in television lines where no picture signals representing normal television picture information are present.

The document "Broadcast Teletext Specification", September 1976, published jointly by the British Broadcasting Corporation, Independent Broadcasting Authority and British Radio Equipment Manufacturers' Association, discloses a specification for transmitting teletext information in 625-line television systems.

In the above-identified document "Broadcast Teletext Specification", a quantity of teletext information to be considered as an entity is termed a page and will be so termed herein. All of the pages which are available are normally transmitted in a recurrent cycle, with or without up-dating page information, as appropriate. At a teletext decoder arrangement any page can be requested, and the digitally coded data representing the page information is then acquired by the teletext decoder arrangement from the cyclic transmission and is stored in a page memory of the teletext decoder arrangement for as long as the page is required.

A current trend in the implementation of a teletext decoder arrangement is to have a memory comprising a plurality of portions or "chapters" in which individual pages can be stored. It is also the current trend to have a plurality of data acquisition circuits which can handle respective page requests simultaneously. Hitherto, it has been found convenient to have the same number of chapters as there are data acquisition circuits and to associate each respective memory chapter with each data acquisition circuit.

The provision of such a memory enables further pages to be acquired and stored whilst another already acquired page is being displayed, thereby reducing the time that a viewer has to wait before such further pages are available for display. This technique affords instant access to pages once they have been acquired. It is therefore now proposed to provide a teletext decoder arrangement with a large memory in which many pages can be stored and are thus available instantly for display without a viewer having to wait for their occurrence in the next page transmission cycle. With this proposal, it is not practical to provide an individual data acquisition circuit for each memory chapter and this gives rise to the problem of associating a large number of memory chapters with each of a plurality of data acquisition circuits for receiving and storing acquired pages.

It is an object of the present invention to provide a teletext decoder arrangement in which this problem is solved in an inexpensive and efficent manner.

According to the invention, a teletext decoder arrangement comprising a plurality of data acquisition circuits, a memory having a capacity for storing a large number of acquired pages in separate memory chapters, first addressing means for addressing the chapters individually and second addressing means for addressing byte locations in each chapter, is characterised in that said first addressing means includes a register file having a number of word locations in each of which any one of a plurality of different pointer bytes can be stored, said word locations being addressable, to read out a pointer byte therein, by respective word addresses each of which pertains to a respective one of the data acquisition circuits, each of said pointer bytes identifying according to its bit values a respective memory chapter and each being usable when read out from a word location to select its memory chapter for the storage therein of a page acquired by the appertaining data acquisition circuit, the arrangement further including processor means for identifying the word location concerned by its word address and for determining the bit values of the pointer byte in that word location.

In carrying out the invention, the bit values of the pointer bytes can be determined by the processor means which is normally provided in the teletext decoder arrangement to control other operations. An existing teletext decoder arrangement would then require only suitable additional software and a register file implemented in hardware for the performance of the invention.

The processor means may be further operable with such additional software for listing in a table register the identity of used memory chapters together with the page numbers of acquired pages which are stored therein. Such a table register would be continuously updated by the processor means when the teletext decoder arrangement is in use and would be interrogated by the processor means when a page request is made to determine whether the requested page has already been acquired and stored in a particular memory chapter. Alternatively, the processor means may be operable when a page request is made to interrogate all of the memory chapters to ascertain whether the requested page has already been acquired and stored in one of them. The table register may be provided in a separate memory or in one of the memory chapters which would otherwise have been available for page storage.

In order that the invention may be more fully understood reference will now be made by way of example to the accompanying drawings, of which:

Figure 1:
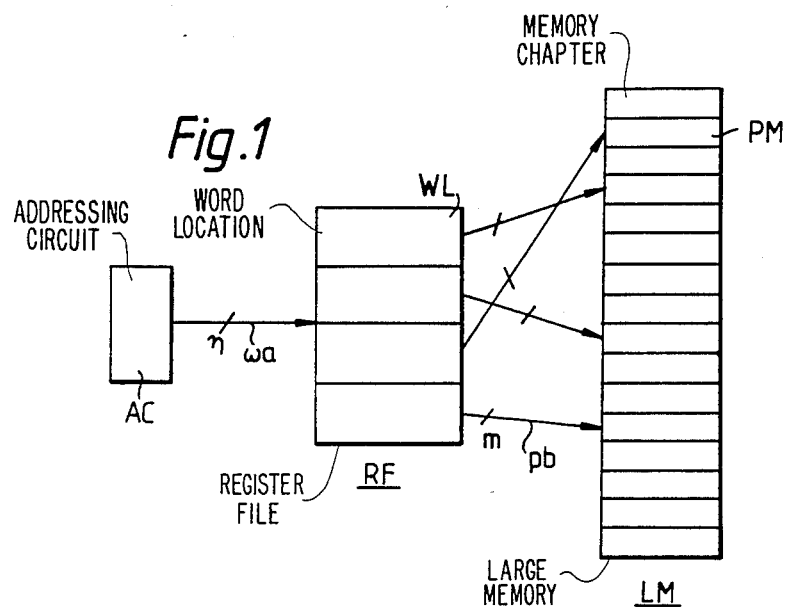
FIG. 1 is a block diagram which illustrates the principle of the invention.
Figure 2:
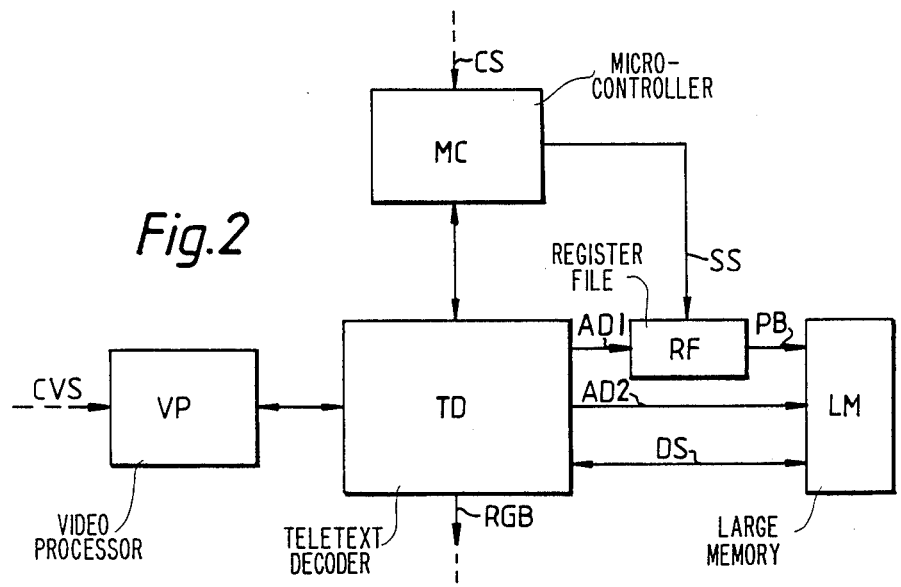
FIG. 2 is a block diagram of a teletext decoder arrangement embodying the invention.

Referring to the drawings, an addressing circuit element AC supplies $n$-bit word addresses wa which are used to address respectively $2^n$ word locations WL of a register file RF. These word locations WL contain respective $m$-bit pointer bytes pb which can identify $2^m$ different memory chapters PM of a large memory LM. Each pointer byte can have any of the $2^m$ different bit values. This addressing principle is implemented in the teletext decoder arrangement represented by the block diagram of FIG. 2. The teletext decoder arrangement comprises a video processor VP, a teletext decoder TD, a microcontroller MC, and a large memory LM. As embodied in a television receiver, the video processor VP is connected to receive an incoming composite video signal CVS from which it extracts the teletext data, regenerates the teletext clock and produces a signal for synchronising text display on a display screen of the television receiver. Such a video processor is now well known in the art and is suitably the integrated circuit VIP$^2$ type SAA 5231 (Mullard). The teletext decoder TD provides all the necessary digital hardware functions for the teletext decoder arrangement. More specifically, it includes circuits for performing the major functions of timing chain character generation, data acquisition, memory interface and interface to the microcontroller MC.

In operation, serial data and clock signals are inputted to the teletext decoder TD from the video processor VP, and the appropriate teletext data is captured by the data acquisition function. The captured data is written into the memory LM via the memory interface and can subsequently be read from the memory and supplied to the character generation function which in turn provides RGB drive signals for the video stages of the television receiver. Timing signals are provided by the timing chain function. Such a teletext decoder is now also well known in the art and is suitably the integrated circuit ECCT type SAA 5243 (Mullard).

The control functions for the teletext decoder arrangement are performed by the microcontroller MC. User control signals CS for page selection and display are supplied to the microcontroller e.g. from a user's remote control handset (not shown). The microcontroller MC can be from the MAB 8051 Series (Philips).

In accordance with the invention, the teletext decoder arrangement includes a register file RF which provides memory chapter pointer bytes PB under the control of a set of signals SS from the microcontroller MC. The register file RF is addressed by the teletext decoder TD with first addressing signals AD1 to generate the pointer bytes PB which select different memory chapters of the memory LM. Second addressing signals AD2 from the teletext decoder TD address the byte locations of the memory chapters and data signals DS are transported between the teletext decoder TD and an addressed byte location of an addressed memory chapter. The register file RF may be at least one Register File 74LS670 (Signetics).

Figure 3:
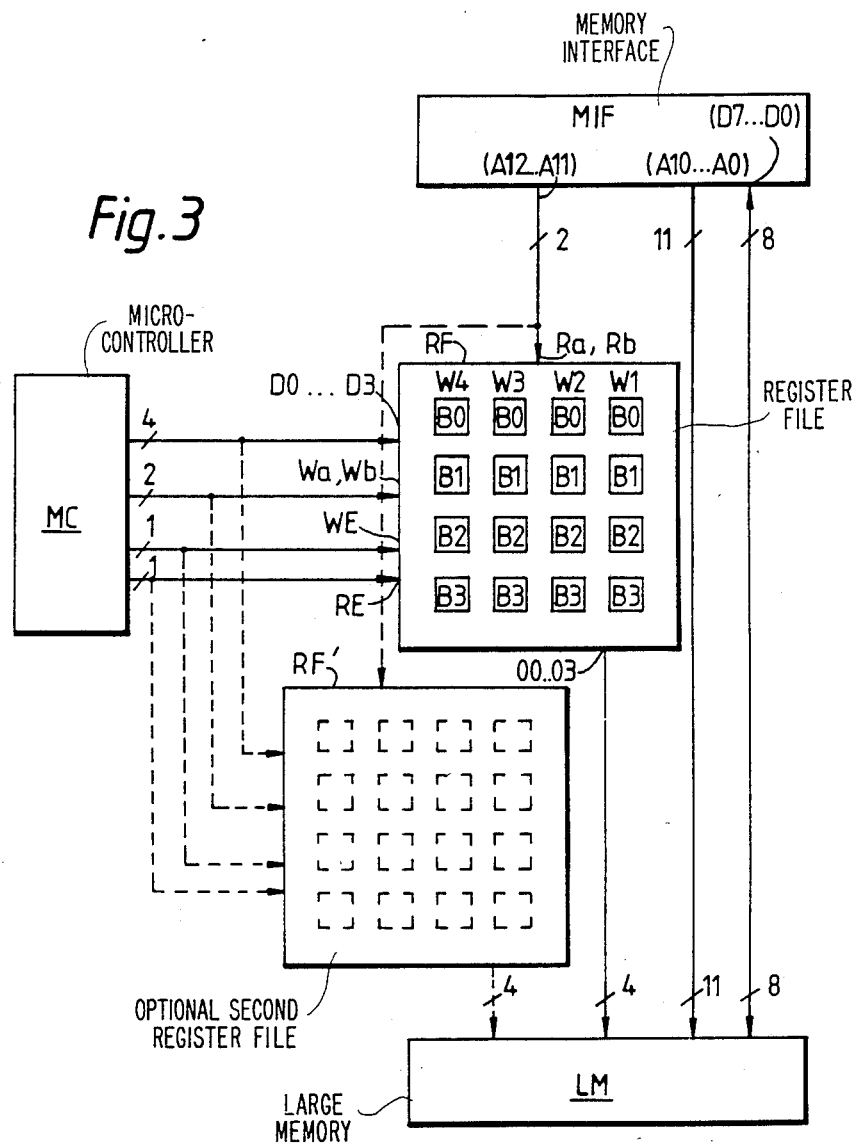
FIG. 3 is a more detailed diagram of certain elements in the block diagram of FIG. 2.

FIG. 3 shows in more detail the arrangement of the register file. As implemented by a single Register File 74LS670, it comprises sixteen D-type flip-flops which are arranged in four banks of four to form four word locations W1, W2, W3, W4 each with four bit elements B0, B1, B2, B3. A 4-bit word to be stored is presented by the microcontroller MC on four data inputs D0 to D3 and the particular word location is determined by a 2-bit write address presented to write address inputs Wa, Wb. When a write enable input WE is LOW, the data is entered into the addressed location. Direct acquisition of any word stored in the four word locations W1 to W4 is effected by presenting a 2-bit read address to read address inputs Ra, Rb. The 4-bit word in the addressed location appears at four outputs 00 to 03 when a read enable input RE is LOW.

The 2-bit read address is constituted by the first addressing signals AD1 which are produced by the teletext decoder TD and applied over address lines A12, A11 All from the memory interface MIF of the teletext decoder TD. These addressing signals identify individually the four different word locations W1 to W4 according to their bit values and correspond respectively to four separate data acquisition circuits in the teletext decoder TD. When a page request is made, the microcontroller MC loads into the word location allocated to the data acquisition circuit involved, a 4-bit pointer byte over inputs D0 to D3. This pointer byte pertains to a free memory chapter and is read out on outputs 00 to 03 to select that memory chapter when the word location is addressed over the address lines A12, A11. Address lines A10 to A0 are then used to address the 2K8 byte locations of the select memory chapter, and character and display data and loaded into these byte locations over the data lines D7 to D0.

The microcontroller would be programmed to list in a table the loading of the memory chapters with the respective pages which have been acquired. Page acquisition would be under user control and also under the control of the microcontroller when linked pages are required.

This table would be interrogated by the microcontroller each time before a new memory chapter is allocated to check the availability of the memory chapters. The table would also be interrogated by the microcontroller to identify the memory chapter in which is stored a page requested for display.

As indicated in dotted line in FIG. 3, the register file RF can be extended to increase the number of different pointer bytes that can be generated and thus the number of memory chapters that can be provided. For instance, as shown in dotted line, providing a second register file RF' having a second block of four 4-bit word locations doubles the number of bits in each pointer bytes to eight. Thus, the number of different pointer bytes is increased from $(2^4)$ 16 to $(2^8)$ 256 with a corresponding increase in the number of memory chapters that can then be provided. A further block of four 4-bit word locations will increase the pointer byte size to 12 bits for selecting 4096 memory chapters, and so on.

From reading the present disclosure, other modifications will be apparent to persons skilled in the art. Such modifications may involve other features which are already known and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A teletext decoder arrangement comprising a plurality of data acquisition circuits, a memory having a capacity for storing a large number of acquired pages in separate memory chapters, first addressing means for addressing the chapters individually and second addressing means for addressing byte locations in each chapter, which teletext decoder arrangement is characterised in that said first addressing means includes a register file having a number of word locations in each of which any one of a plurality of different pointer bytes can be stored, said word locations being addressable, to read out a pointer byte stored therein, by respective word addresses each of which pertains to a respective one of the data acquisition circuits, each of said pointer bytes identifying according to its bit values a respective memory chapter and each being usable when read out from a word location to select its memory chapter for the storage therein of a page acquired by the appertaining data acquisition circuit, the arrangement further including processor means for identifying the word location concerned by its word address and for determining the bit values of the pointer byte in that word location.

2. A teletext decoder arrangement as claimed in claim 1, characterised in that the register file comprises four 4-bit word locations each for storing any one of sixteen different chapter memory pointer bytes.

3. A teletext decoder arrangement as claimed in claim 1, characterised in that the register file comprises four 8-bit word locations each for storing any one of two hundred and fifty six different chapter memory pointer bytes.

4. A teletext decoder arrangement as claimed in claim 1, 2, or 3, characterised in that said processor means is further operable to list in a table register the identity of used memory chapters together with the page numbers of acquired pages which are stored therein.

5. A teletext decoder arrangement as claimed in claim 4, characterised in that said processor means is operable to continuously update the table register when the arrangement is in use and the table register is interrogated by the processor means when a page request is made to determine whether the requested page has already acquired and stored in a particular memory chapter.

6. A teletext decoder arrangement as claimed in claim 4, characterised in that said table register is provided in at least one of the memory chapters.

7. A teletext decoder arrangement as claimed in claims 1, 2 or 3, characterised in that said processor means is operable when a page request is made to interrogate all of the memory chapters to ascertain whether the requested page has already been acquired and stored in one of them.

8. A television receiver including a teletext decoder arrangement as claimed in claim 1, 2, or 3.

9. A teletext decoder arrangement as claimed in claim 5, characterized in that said table register is provided in at least one of the memory chapters.

10. A television receiver including a teletext decoder arrangement as claimed in claim 4.

11. A television receiver including a teletext decoder arrangement as claimed in claim 5.

12. A television receiver including a teletext decoder arrangement as claimed in claim 6.

13. A television receiver including a teletext decoder arrangement as claimed in claim 7.

* * * * *